US006766290B2

(12) United States Patent
Grau

(10) Patent No.: US 6,766,290 B2
(45) Date of Patent: Jul. 20, 2004

(54) VOICE RESPONSIVE AUDIO SYSTEM

(75) Inventor: Iwan R. Grau, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/822,780

(22) Filed: Mar. 30, 2001

(65) Prior Publication Data

US 2003/0023447 A1 Jan. 30, 2003

(51) Int. Cl.[7] .......................... G10L 15/20; G10L 21/02
(52) U.S. Cl. ....................................... 704/211; 704/275
(58) Field of Search ................................ 704/226, 275, 704/500, 502, 503, 211

(56) References Cited

U.S. PATENT DOCUMENTS 4,301,536 A * 11/1981 Favin et al. ................ 714/714
5,267,323 A * 11/1993 Kimura ...................... 381/110
5,521,635 A * 5/1996 Mitsuhashi et al. ...... 348/231.4
5,548,335 A * 8/1996 Mitsuhashi et al. ......... 348/373
5,809,472 A * 9/1998 Morrison .................... 704/500
5,828,768 A * 10/1998 Eatwell et al. .............. 381/333
5,870,705 A * 2/1999 McAuliffe et al. .......... 704/225
6,219,645 B1 * 4/2001 Byers ......................... 704/275
6,397,186 B1 * 5/2002 Bush et al. ................. 704/274
6,651,040 B1 * 11/2003 Bakis et al. ................ 704/225
2001/0039494 A1 * 11/2001 Burchard et al. ........... 704/246

* cited by examiner

*Primary Examiner*—Richemond Dorvil
*Assistant Examiner*—Martin Lerner
(74) *Attorney, Agent, or Firm*—Trop, Pruner & Hu, P.C.

(57) ABSTRACT

An audio/video system may generate audio data for a user. The user in turn may provide voice commands to the audio/video system. The audio generated by the system may be adaptively delayed, amplitude adjusted, and subjected to sampling interval shifting before subtracting it from the composite signal received from a microphone. As a result, the audio generated by the system can be subtracted from a signal representing both the audio generated and the spoken command to facilitate the recognition of the spoken command. In this way, a voice responsive audio/video system may be implemented.

25 Claims, 8 Drawing Sheets

VOICE RESPONSIVE AUDIO SYSTEM

BACKGROUND

This invention relates generally to audio/video systems that respond to spoken commands.

A variety of audio/video systems may respond to spoken commands. For example, an in-car personal computer system may play audio stored on compact discs and may also respond to the user's spoken commands. A problem arises because the audio interferes with the recognition of the spoken commands. Conventional speech recognition systems have trouble distinguishing the audio (that may itself include speech) from the spoken commands.

Other examples of audio/video systems that may be controlled by spoken commands include entertainment systems, such as those including compact disc or digital videodisc players, and television receiving systems. Audio/video systems generate an audio stream in the form of music or speech. At the same time some audio/video systems receive spoken commands to control their operation. The spoken commands may be used to start or end play or to change volume levels, as examples.

Audio/video systems may themselves generate audio that may interfere with the system's ability to respond to spoken commands. Thus, there is a need for better ways to enable audio/video systems to respond to spoken commands.

DETAILED DESCRIPTION

Figure 1:
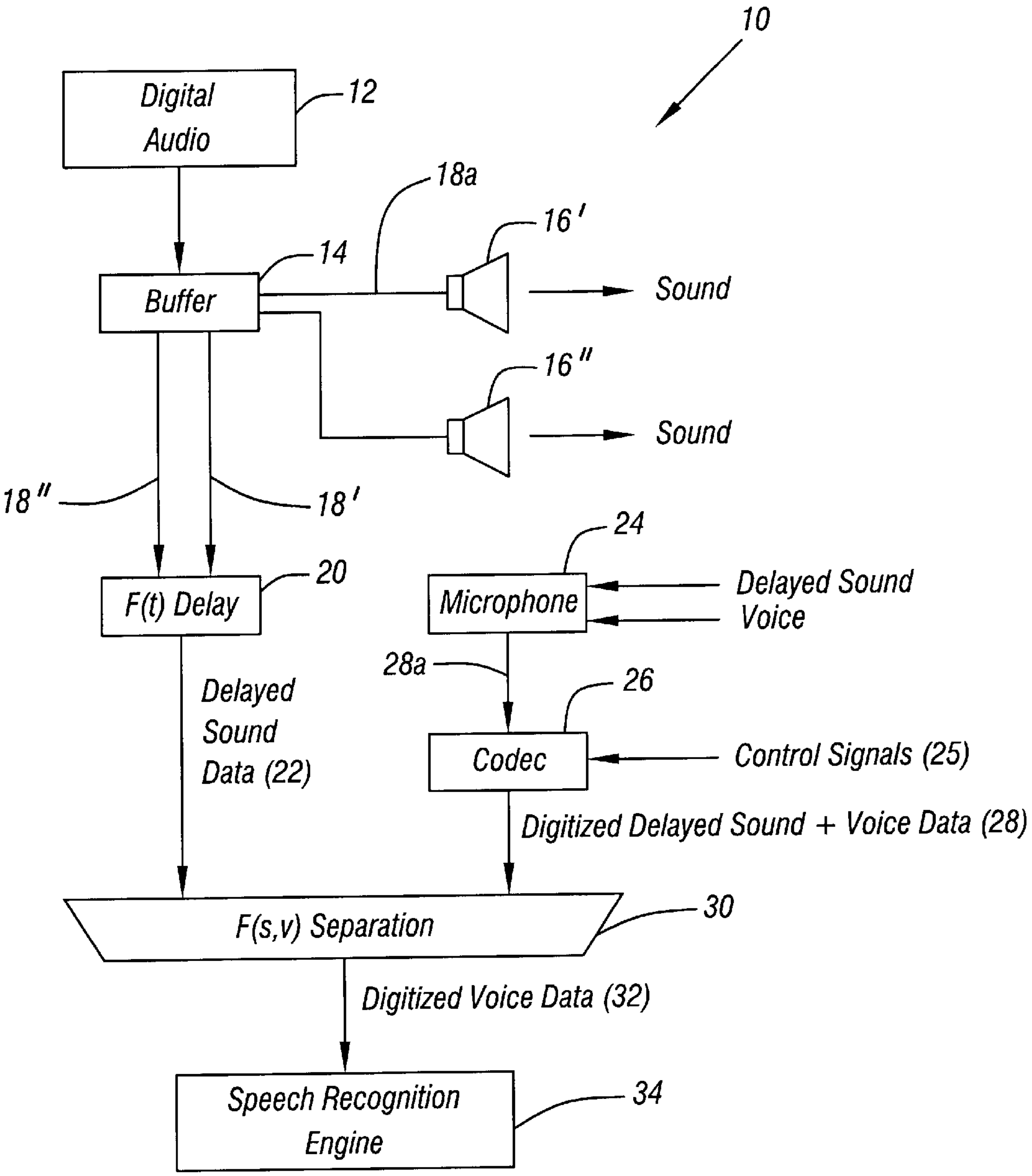
FIG. 1 is a schematic depiction of one embodiment of the present invention.

An audio/video system 10, shown in FIG. 1, generates audio information and responds to spoken commands. Examples of audio/video systems 10 include television receivers, entertainment systems, set-top boxes, stereo systems, in-car personal computer systems and computer systems to mention just a few examples. The system 10 produces audio information that may be music or other content indicated by the arrows labeled "sound". At the same time the system 10 is controlled by a user's voice commands indicated by the arrow labeled "voice". The speech recognition function of the system 10 would be adversely affected by the system 10 generated audio ("delayed sound"), absent corrective action.

The output audio information from a digital audio source 12, such as a compact disc player or other source of digital or digitized audio, is buffered in the buffer 14. From the buffer 14, the audio information may be played through a pair of speakers 16' and 16", for example, as music. In one embodiment each speaker 16' or 16" plays one of the left or right stereo channels.

The buffer 14 also provides the audio data 18' and 18' for each channel to an adaptive delay 20. The adaptive delay 20 time delays the data channels that were used to generate the audio streams before feeding them for subtraction or separation 30. The adaptive delay 20 provides a delay that simulates the delay between the time that it takes for sound generated by the speakers 16 (indicated by the arrow labeled "delayed sound") to reach the microphone 24.

The adaptive delay 20 is adaptive because the amount of delay between the generated audio streams from the speakers 16 and the received audio streams at the microphone 24 varies with a wide number of factors. The adaptive delay 20 compensates for a number of factors including speaker 16 or microphone 24 placement, air density and humidity. The result of the adaptive delay 20 is delayed sound data 22 that may be used for separation 30.

The microphone 24 receives the delayed sound and voice, converts them into an analog electrical waveform 28*a* and feeds the waveform 28*a* to a coder/decoder (codec) 26. The output of the codec 26 is digitized delayed sound and voice data 28. The sampling interval of the codec 26 may be adjusted by the control signals 25. The data 28 is then subjected to separation 30 to identify the voice command within the data 28.

The delayed sound data 22 is subtracted during separation 30 from the digitized delayed sound and voice data 28. The result is digitized voice data 32 that may be provided to a speech recognition engine 34. Absent the delayed sound generated by the system 10 itself, the speech recognition engine 34 may be more effective in recognizing the spoken, user commands. If desired, noise cancellation may be provided as well.

To overcome the effects of the ambient between the speakers 16 and the microphone 24, the delayed sound received at the microphone 24 may be adjusted to match the internal signal from the buffer 14 (or vice versa). A sampling interval shifting algorithm may be used so that the sampling interval in the codec 26 matches the original sampling interval used in the audio source 12. Amplitude matching algorithms may be used so that the amplitude of the signal received by the microphone 24, that may be diminished compared to what was generated by the speakers 16, may be multiplied to restore its original amplitude. A multiple audio source combining algorithm may be needed because two or more channels are separately generated by the speakers 16 but only a combined signal is received by the microphone 24.

Figure 2A:
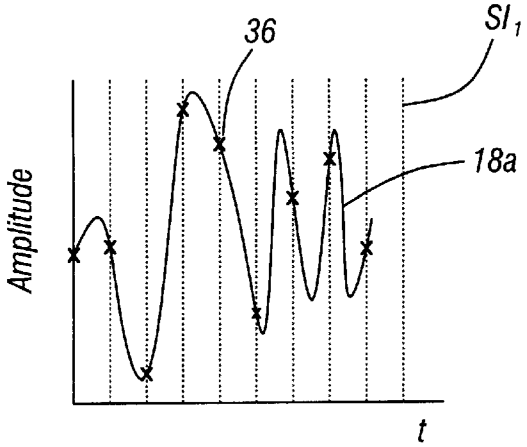
FIG. 2*a* is a graph of amplitude versus time showing hypothetical audio data generated by the system shown in FIG. 1.

The sampling interval shifting algorithm shifts the waveform 28*a* sampling points to cause them to match the waveform sampling points used by the source 12. In FIG. 2*a* an audio waveform 18*a* is plotted with its amplitude on the vertical axis and time on the horizontal axis. The waveform 18*a* is a hypothetical example of a signal from the buffer 14 to the speaker 16'. The waveform 18*a* may, for example, include music information. A plurality of sampling points 36 are indicated on the waveform 18*a* which were sampled at a sampling interval $SI_1$. These sampling points 36 (together with additional sampling points) were used to create the digital audio signal in the buffer 14.

Figure 2B:
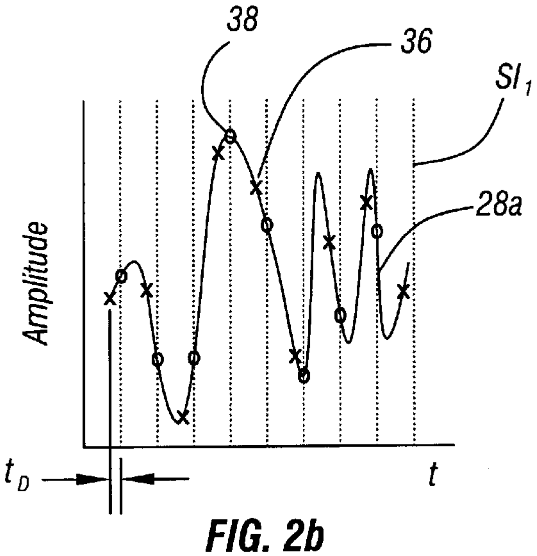
FIG. 2*b* is a graph of amplitude versus time showing a hypothetical waveform received by the system shown in FIG. 1 when no spoken commands have been generated.

The waveform 28*a*, shown in FIG. 2*b*, is an example of waveform 28*a* received by the microphone 24. For simplicity in this hypothetical example, there was no spoken command, only a single channel was generated and the speaker 16' was proximate to the microphone 24. Thus, the waveform 28*a* looks like the system 10 generated waveform 18*a* with a small time delay, $t_D$, due to the arrangement of the microphone 24 relative to the speaker 16'. The sampling points 38 (indicated as "0"s) correspond to those sampling points at which the waveform 28*a* would have been sampled if the original sampling interval $SI_1$, were used on the time shifted waveform 28*a* received by the microphone 24.

Figure 2C:
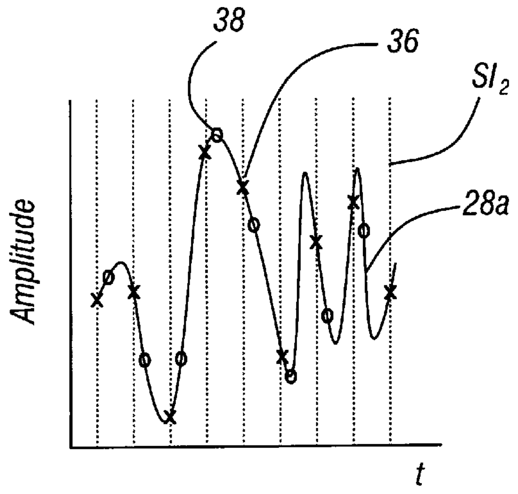
FIG. 2*c* is a graph of amplitude versus time showing the sampling of the waveform shown in FIG. 2*b;*

The sampling interval, $SI_2$, shown in FIG. 2*c*, is shifted by the time delay $t_D$. As a result, the points 36 (indicated as "x's") are sampled in the time shifted waveform 28*a* instead of the points 38 shown in FIG. 2*b*. Shifting the sampling interval $SI_1$, simplifies and improves the separation 30.

Figure 3A:
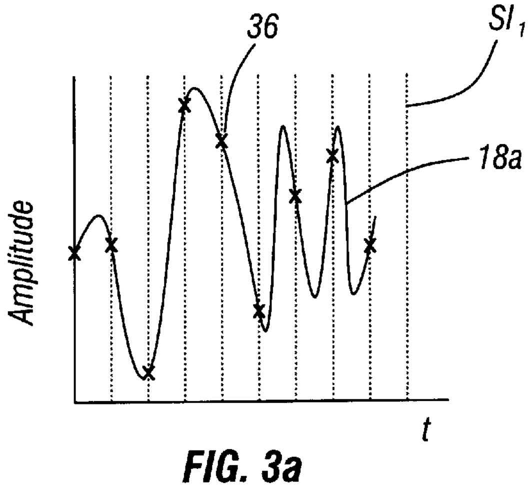
FIG. 3*a* is a graph of amplitude versus time for a hypothetical waveform representing audio data generated by the system shown in FIG. 1.
Figure 3B:
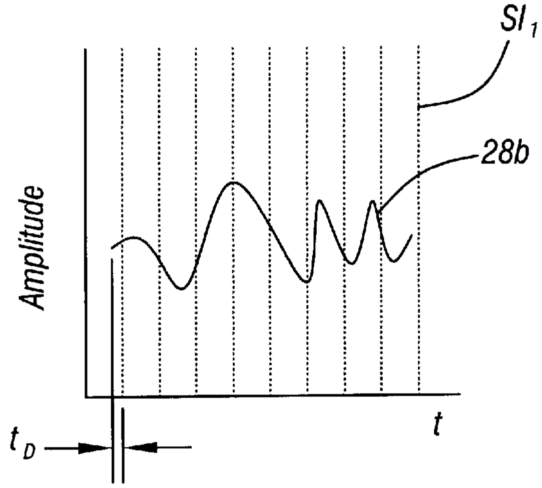
FIG. 3*b* is a graph of amplitude versus time for a waveform representing audio data received by the system shown in FIG. 1.

Turning next to FIG. 3*a*, the system 10 generated waveform 18*a* is sampled at the sampling interval $SI_1$. A hypothetical waveform 28*a*, shown in FIG. 3*b*, is received by the microphone 24. Again, in this hypothetical example, no spoken command was received, and only one audio channel was generated (by the speaker 16'). However, in this case the separation between the speaker 16' and the microphone 24 was increased. The amplitude of the waveform 28*a*, shown in FIG. 3*b*, is smaller than that of the waveform 18*a*. The amplitude of the waveform 28*b* received by the microphone 28 is diminished due to factors like the spacing between the microphone 24 and the speaker 16', the gain of the microphone 24, etc. Again, the waveform 28*c* is time delayed relative to the waveform 18*a*.

Figure 3C:
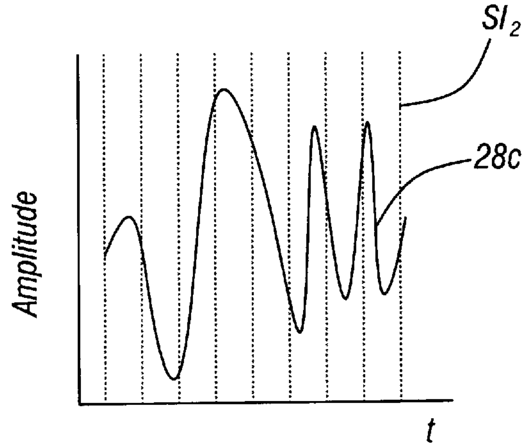
FIG. 3*c* is a graph of amplitude versus time showing the processed audio data in accordance with one embodiment of the invention.

An amplitude matching algorithm increases the magnitude of the waveform 28*c*, as shown in FIG. 3*c*, so that the amplified waveform 28*c* matches the amplitude of the original waveform 18*a*. In addition, the waveform 28*c* is interval time shifted using the adjusted sampling interval $SI_2$.

As a result, delayed sound generated by the system 10 (i.e. the waveform 18*a*), as received by the microphone 24 (as waveform 28*a*), may be eliminated as a source of interference to the speech recognition engine 34. The digitized delayed sound and voice data 28, may be subjected to an adaptive delay, an amplitude matching algorithm and a sampling interval shifting. Then the delayed sound data 22 may be subtracted from the data 28 to generate the digitized voice data 32. These operations may all be done in the digital domain.

Figure 4:
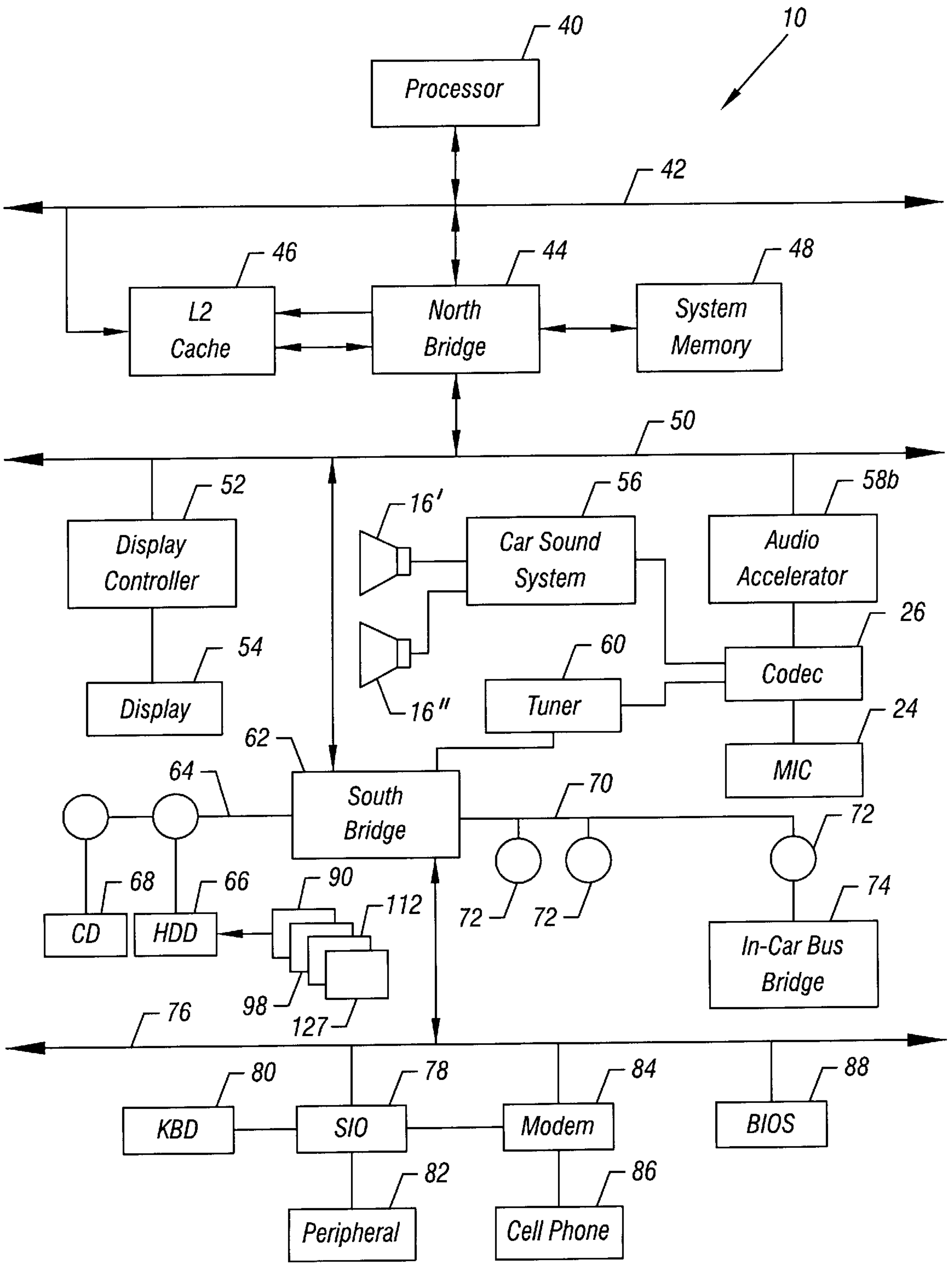
FIG. 4 is a block diagram of one embodiment of the present invention.

In an embodiment in which the system 10 is an in-car personal computer system, shown in FIG. 4, a processor 40 may be coupled to a host bus 42. The host bus 42 is coupled to Level Two or L2 cache 46 and a north bridge 44. The north bridge 44 is coupled to the system memory 48.

The north bridge 44 is also coupled to a bus 50 that in turn is connected to an audio accelerator 58*b*, a south bridge 62 and a display controller 52. The display controller 52 may drive a display 54 that may be located, for example, in the dashboard of an automobile (not shown).

The microphone 24 may feed to the audio coder/decoder 97 (AC'97 codec) 26 where it is digitized and sent to memory through the audio accelerator 58*b*. The AC'97 specification (Revision 2.1 dated May 22, 1998) is available from Intel Corporation, Santa Clara, Calif. A tuner 60 is controlled from the south bridge 62 and its output is sent to the system memory 48 or mixed in the codec 26 and sent to the car sound system 56. The sounds generated by the processor 40 are sent through the audio accelerator 58*b* and the AC'97 codec 26 to the car sound system 56 and on to the speakers 16.

The south bridge 62 is coupled to a hard disk drive 66 and a compact disc player 68 that, in one embodiment, may be the source of the audio sound. The south bridge 62 may also be coupled to a universal serial bus (USB) 70 and a plurality of hubs 72. One of the hubs 72 may connect to an in-car bus bridge 74. The other hubs are available for implementing additional functionality. An extended integrated device electronics (EIDE) connection 64 may couple the hard disk drive 66 and CD ROM player 68.

The south bridge 62 in turn is coupled to an additional bus 76 which may couple a serial interface 78 that drives a peripheral 82, a keyboard 80 and a modem 84 coupled to a cell phone 86. A basic input/output system (BIOS) memory 88 may also be coupled to the bus 76.

Figure 5:
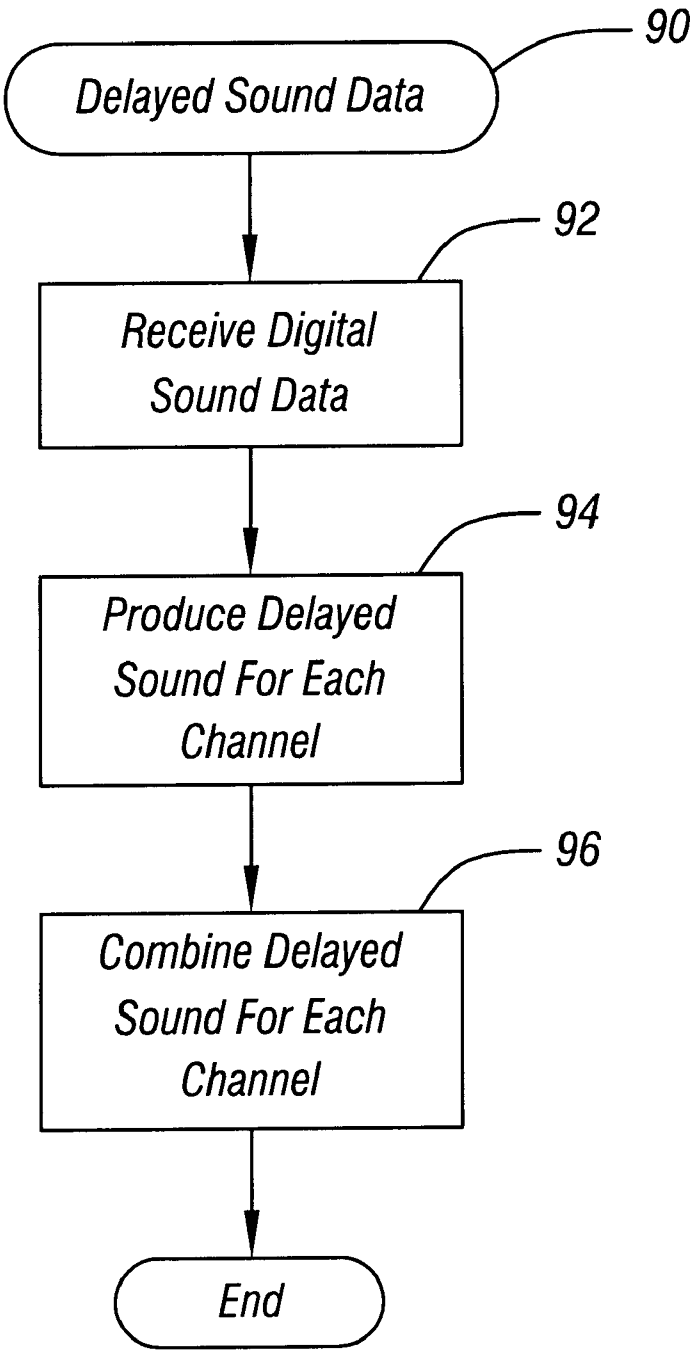
FIG. 5 is a flow chart for software in accordance with one embodiment of the invention.

Turning next to FIG. 5, in an embodiment in which the data manipulation is done through software, the software 90 may be utilized to implement a multiple audio source combining algorithm in accordance with one embodiment of the present invention. Initially, the digital sound data is received in the buffer 14 from the source 12 as indicated in block 92. The sound data may then be delayed by the time delay $t_D$, as indicated in block 94 in FIG. 5. However, the delay may be implemented for each channel of sound. Thus, the signals 18' and 18" (FIG. 1) may be each adaptively delayed and then combined to create the delayed sound data 22. In this way, delayed sound data may be created for each channel of two or more channels. The delayed sound data is then combined for each channel as indicated in block 96. The resulting delayed sound data 22 is used for separation 30.

Figure 6:
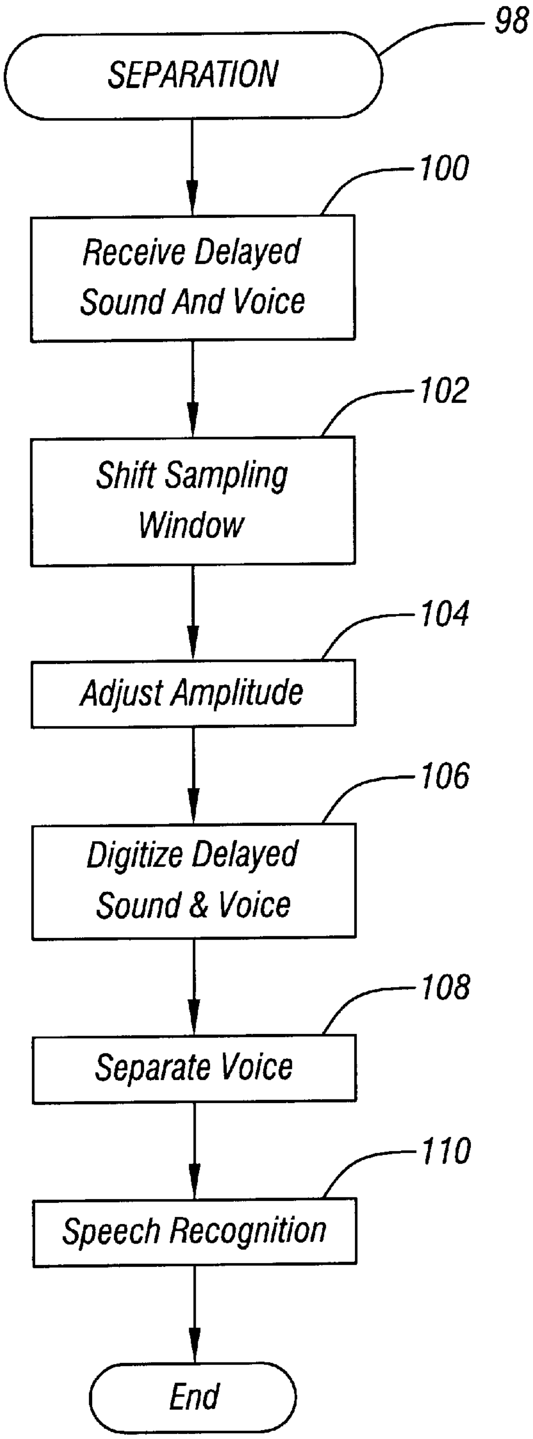
FIG. 6 is a flow chart for software in accordance with one embodiment of the invention.

Separation 30 may be accomplished using the software 98, shown in FIG. 6, in one embodiment of the invention. Digitized delayed sound and voice data 28 may be received for separation 30 as indicated in block 100. The sampling interval of the codec 26 may be continuously adjusted as indicated in block 102. The control signals 25, generated pursuant to instructions from the processor 40, are applied to the codec 26. The control signals 25 (FIG. 1) modify the sampling interval $SI_1$ to account for the transmission delay $t_D$, creating the new sampling interval $SI_2$. Thus, after a set up delay, the data 28 received for separation has been digitized using the sampling interval $SI_2$. As a result, substantially the same points 36, sampled at the buffer 14, are sampled by the codec 26.

The waveform 28*a* may also be amplitude adjusted as indicated in block 104. For example, the signal 28*a* may be multiplied by a correction factor to generate a signal having the amplitude characteristics of the waveform 18*a* from the buffer 14. Again, control signals 25 may be applied to the codec 26 to provide the needed multiplication. Thereafter, the waveform 28*a* may be digitized as indicated in block 106 to create the digitized delayed sound and voice data 28.

The delayed sound data 22 now accommodates multiple channels (FIG. 5) and has been delayed to accommodate for the time delay between the time sound, produced by the speakers 16, is received by the microphone 24. The data 22 is subtracted from the delayed sound and voice data 28 (block 108). The result is the digitized voice data 32 that may be subjected to speech recognition (block 110). Since the audio produced by the source 12 has been removed, the speech recognition engine 34 may more readily identify and recognize the speech commands received from the user.

Figure 7:
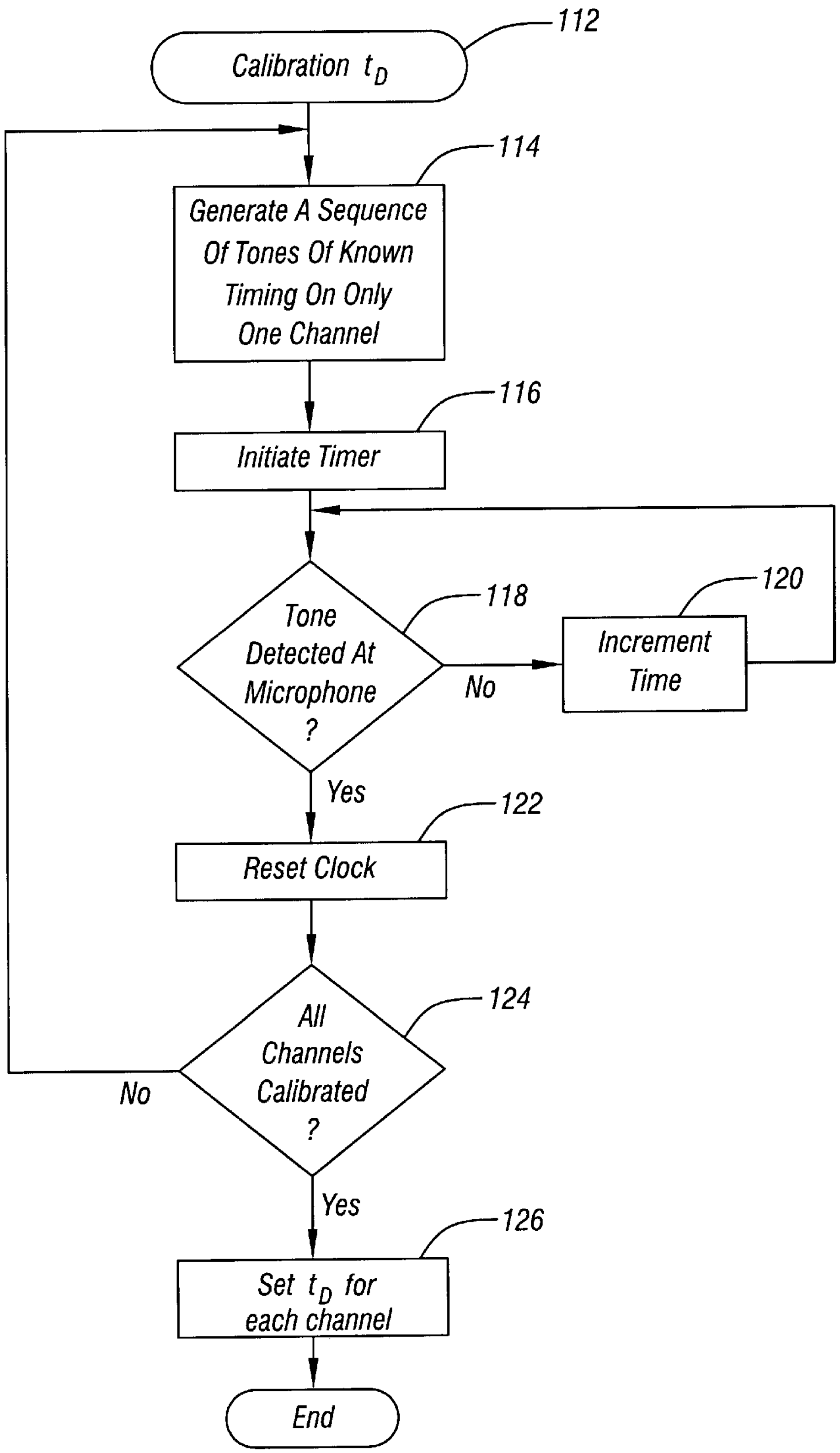
FIG. 7 is a flow chart for calibration software in accordance with one embodiment of the present invention.

The software 112, as shown in FIG. 7, develops the time delay $t_D$ in accordance with one embodiment of the present invention. Initially, a sequence of tones of known timing is generated on only one channel as indicated in block 114. Thus, the buffer 14 may produce tones through the speaker 16' under control of the processor-based system 10. A timer is initiated as indicated in block 116. A check at diamond 118 determines whether the sequence of tones is detected at the microphone 24 as indicated in diamond 118. If not, the time is incremented as indicated in block 120. Otherwise, the clock is reset as indicated in block 122. A check at diamond 124 determines whether each channel has been successively calibrated. If not, the next channel is calibrated. For example, a sequence of tones of known timing can be generated through the speaker 16". Once all channels are calibrated, the time delay $t_D$ is set as indicated in block 126. The time delay $t_D$ may be the mean or average of the time delays for each channel as one example. The $t_D$ value is then used by the processor 40 to generate control signals 25 for controlling the sampling interval $SI_2$ in the codec 26.

Figure 8:
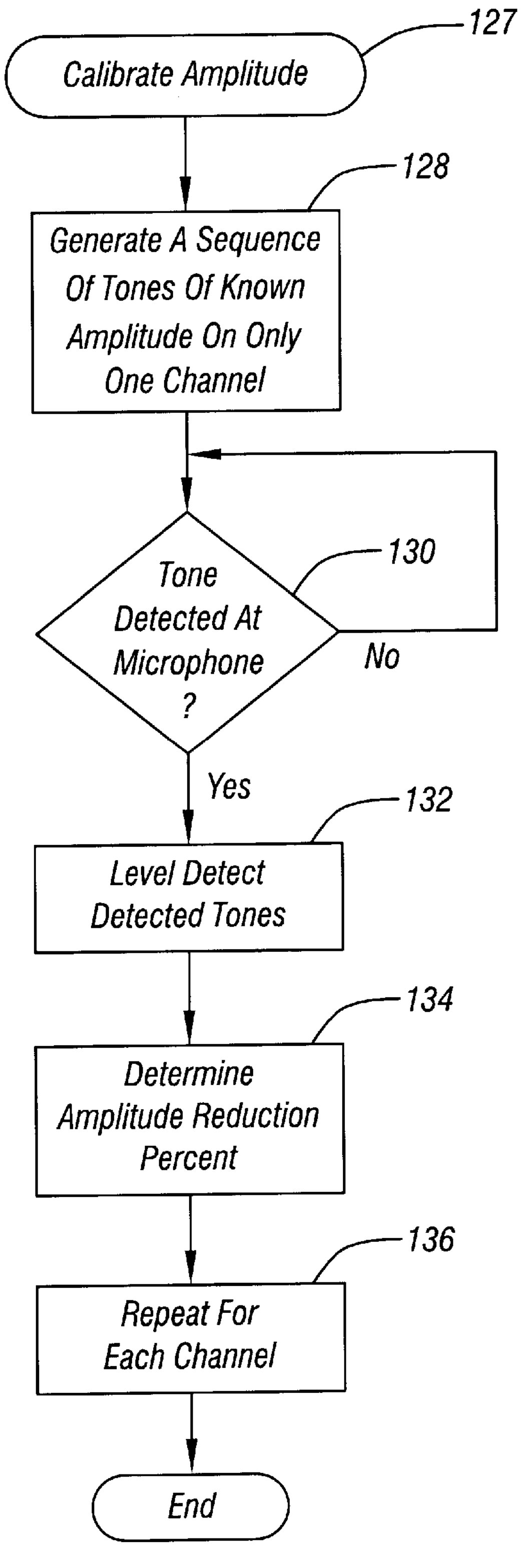
FIG. 8 is a flow chart for calibration software in accordance with one embodiment of the present invention.

The software 127, shown in FIG. 8, may be used to calibrate for the amplitude reduction of a given arrangement of speakers 16 with respect to the microphone 24 in accordance with one embodiment of the present invention. Initially, a sequence of tones of known amplitude is generated on only one channel, for example, through the speaker 16'. When a tone is detected at the microphone 24, as indicated in block 130, a signal may be generated that enables a comparison between the received and generated amplitudes.

The detected levels (block 132) are then compared to the known levels of the tones generated through the speaker 16'. The amplitude reduction percentage may then be determined as indicated in block 134. In one embodiment of the present invention, tones of a variety of different amplitudes may be utilized to determine percentages of reduction. A mean or average reduction may then be utilized. Next, as indicated in block 136, the amplitude reduction percentage is determined for each channel.

The amplitude reduction percentage for each channel may then be averaged in accordance with one embodiment of the present invention. The averaged amplitude reduction percentage may then be utilized by the processor 40 to generate control signals 25 for adjusting the amplitude in the codec 26 of the analog signals 28*a* received from the microphone 24.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

generating a first audio signal;

receiving, in a processor-based system, a second audio signal including spoken commands and audio information generated by said system; and separating said audio information from said spoken commands using said first audio signal; and adjusting the amplitude of the second audio signal so that the amplitude of the second audio signal matches the amplitude of said first audio signal.

2. The method of claim 1 wherein separating said audio information includes adjusting the sampling interval of said first audio signal.

3. The method of claim 1 including conducting speech recognition analysis of the separated spoken commands.

4. The method of claim 1 including generating digital sound data and producing delayed sound data for at least two channels.

5. The method of claim 4 including combining said delayed sound data for each channel.

6. The method of claim 5 including converting said second audio signal to a second digital signal and subtracting said combined delayed sound data from said second digital signal.

7. The method of claim 1 including generating a sequence of tones of known timing, initiating a timer upon the generation of said sequence of tones, and receiving said sequence of tones and determining the amount of time from the generation of said sequence to the receipt of said sequence.

8. The method of claim 7 including adjusting the time delay for the delayed sound data for each channel based on the time to receive said sequence.

9. The method of claim 1 further including generating a sequence of tones of known amplitude, detecting said tones, determining the loss of amplitude of said tones as detected, determining an amplitude reduction and using said amplitude reduction to adjust the amplitude of said second audio signal.

10. An article comprising a medium storing instructions that enable a processor-based system to:

generate a first audio signal;

receive a second audio signal including spoken commands and audio information generated by said system; and separate the audio information from said spoken commands using said first audio signal by adjusting the amplitude of the second audio signal so that the amplitude of the second audio signal matches the amplitude of said first audio signal.

11. The article of claim 10 further storing instructions that enable the processor-based system to adjust the sampling interval of the first audio signal.

12. The article of claim 10 further storing instructions that enable the processor-based system to conduct speech recognition analysis of the separated spoken commands.

13. The article of claim 10 further storing instructions that enable the processor-based system to generate digital sound data and produce delayed sound data for at least two channels.

14. The article of claim 13 further storing instructions that enable the processor-based system to combine the delayed sound data for each channel.

15. A system comprising:

a delay unit to provide an adjustable time delay to a digital signal after the signal was converted to an audible format;

an encoder to digitize the signal received in an audio format; and a separation unit to separate the digital signal from the digitized audio signal by adjusting the sampling interval of the digital sign.

16. The system of claim 15 including a speech recognition engine coupled to the separation unit.

17. The system of claim 15 including a device to cause the amplitude of the first and second signals to be substantially similar.

18. The system of claim 15 wherein the delay unit delays the digital signal to correspond to the delay between the generation of the signal in the audible format and its receipt by the system.

19. The system of claim 15 wherein the system adjusts the sampling interval of one of the received audio signal and the signal generated in an audible format.

20. A method comprising:

generating a first audio signal;

receiving, in a processor-based system, a second audio signal including spoken commands and audio information generated by said system; and separating said audio information from said spoken commands using said first audio signal by adjusting the sampling interval of said first audio signal.

21. The method of claim 20 wherein separating said audio information includes adjusting the amplitude of the second audio signal.

22. The method of claim 20 further including generating a sequence of tones of known amplitude, detecting said tones, determining the loss of amplitude of said tones as detected, determining an amplitude reduction and using said amplitude reduction to adjust the amplitude of said second audio signal.

23. An article comprising a storage medium storing instructions that, if executed, enable a processor-based system to:

generate a first audio signal;

receive, in a processor-based system, a second audio signal including spoken commands and audio information generated by said system; and separate said audio information from said spoken commands using said first audio signal by adjusting the sampling interval of said first audio signal.

24. The article of claim 23 further storing instructions that, if executed, enable a processor-based system to adjust the amplitude of the second audio signal.

25. The article of claim 23 further storing instructions that, if executed, enable a processor-based system to generate a sequence of tones of known amplitude, detect said tones, determine the loss of amplitude of said tones as detected, determine an amplitude reduction and use said amplitude reduction to adjust the amplitude of said second audio signal.

* * * * *